May 24, 1938.　　E. B. BIRKENBEUEL　　2,118,289
COUPLING FOR COAL WORM SECTIONS
Filed May 18, 1936
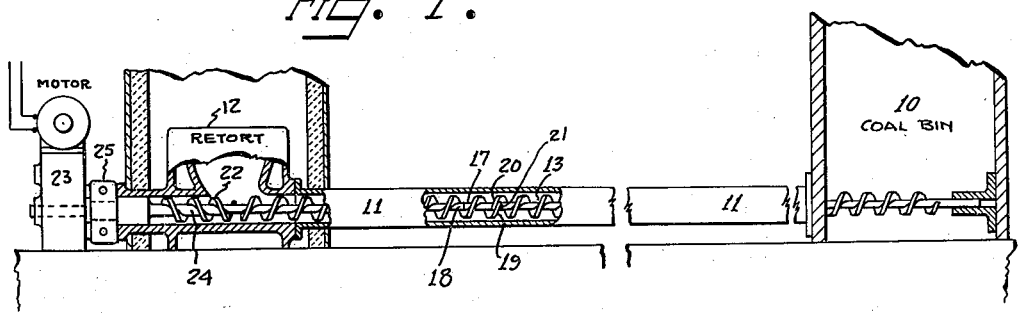
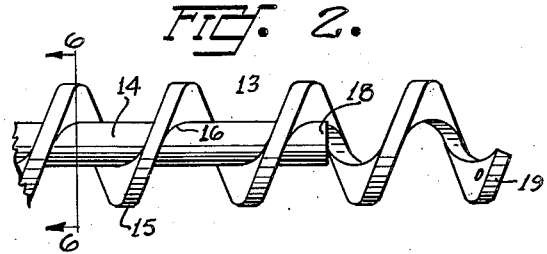
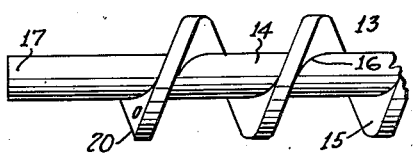
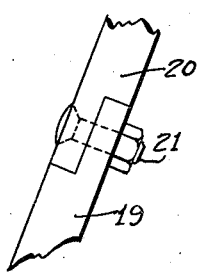
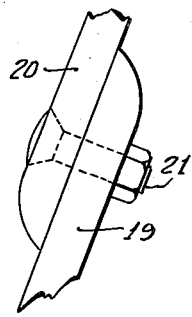
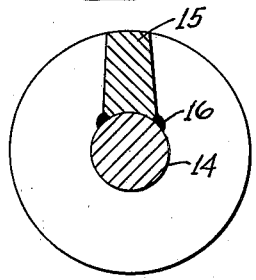
INVENTOR
E. B. Birkenbeuel, Patented May 24, 1938

2,118,289

UNITED STATES PATENT OFFICE 2,118,289

COUPLING FOR COAL WORM SECTIONS

Edward B. Birkenbeuel, Portland, Oreg., assignor to Iron Fireman Manufacturing Company, Portland, Oreg.

Application May 18, 1936, Serial No. 80,397

1 Claim. (Cl. 198—213)

This invention relates generally to coal worms for underfeed stokers and particularly to a coupling for uniting coal worm sections.

The main object of this invention is the provision of an improved form of coupling for uniting the sections of an elongated coal worm in a manner that its thrust bearing may be placed near its discharge end for the purpose of subjecting the screw to tension instead of placing it in compression as is ordinarily the case.

The second object is to make it possible to reduce the friction load on a worm drive by causing the worm to be continually urged toward a straight line axis and to provide an inexpensive and rugged form of connection between the worm sections and one which will not offer an objectionable resistance to the movement of fuel through the coal tube.

These, and other objects, will become more apparent from the specification following as illustrated in the accompanying drawing, in which:

Fig. 1 is a sectional view through a stoker installation having a rear end drive and elongated coal screw for which this coupling is especially useful.

Fig. 2 is a fragmentary elevation of one end of the coal worm section.

Fig. 3 is a fragmentary elevation of the adjacent end of the next coal worm section.

Fig. 4 is a fragmentary view showing the preferred form of flight fastening.

Fig. 5 is a similar view showing a modified form of flight fastening.

Fig. 6 is a transverse section taken along the line 6—6 in Fig. 2.

Similar numbers of reference refer to similar parts throughout the several views.

Before entering into an explanation of this invention, it must be understood that it has long been the practice to make elongated worms in sections and to unite these by various forms of couplings, most of these being intended for use when the worm was operated in compression. The objection to most of these connections, however, resided in the increased resistance which they offered to the movement of fuel through the coal tube. With my construction, the core of the worm is not enlarged at all and the flights need not be thickened at the point of coupling. Also, the sections may be united or separated with little effort, and the sections thereof are rigidly united in axial alignment.

Referring in detail to the drawing, there is shown a coal bin 10 which communicates by means of a coal tube 11 with a retort 12 of an underfeed stoker. Within the tube 11 are a plurality of sections 13 of coal worm which are ordinarily identical, although if desired can be made of different pitches or thicknesses of flight to suit the ideas of the designer. Each section 13 consists of a shaft or core 14 upon which is formed a helical flight 15. The flight 15 is secured to the shaft 14 by the welds 16. This type of worm is described as being especially adaptable for use in connection with my construction.

Each section 13 has one end 17 of its shaft 14 projecting beyond its nearest end of the flight 15 while the end 18 of the shaft 14 does not extend as far axially as does its end of the flight 15. The distances which the end 17 projects from one end of the section 13 is substantially the same as the distance which the end 18 recedes into its end of the section 13. In other words, when the ends 17 and 18 contact each other, the worm flight 15 is continuous, and its overlapping ends 19 and 20 may be scarfed as shown in Fig. 4 or merely overlapped as shown in Fig. 5. In either event, the ends 19 are securely joined by means of the bolt or rivet 21.

The discharge end of the assembled sections 13 extend into the retort 12. The end section thereof preferably has a reversed flight 22 formed thereon to prevent coal from working out of the retort toward the drive mechanism 23, which is connected directly to the shaft 24 of the reversed flight 22. A thrust bearing 25 carries the axial load of the coal worm.

It can be seen by the foregoing that with this construction, elongated worms of any length can be produced from a few standard lengths of worm section 13 and when once assembled, the sections will have the characteristics of a one piece worm and will be without the objectionable obstructions in the way of couplings of the type now in common use.

I claim:

A conveyor worm comprising a pair of spiral conveyor elements having their adjacent ends joined and having a cylindrical opening therethrough, a shaft forming a core for one of said flights secured thereto and projecting from the end thereof, the end portion of the second flight being devoid of a core but having a cylindrical opening therein adapted to receive said projecting shaft end.

EDWARD B. BIRKENBEUEL.